United States Patent [19]
Collette et al.

[11] Patent Number: 5,266,149
[45] Date of Patent: Nov. 30, 1993

[54] IN-MOLD LABELLING SYSTEM

[75] Inventors: Wayne N. Collette, Merrimack; Ieuan L. Harry; Louis M. Silva, both of Nashua, all of N.H.

[73] Assignee: Continental PET Technologies, Inc., Florence, Ky.

[21] Appl. No.: 822,147

[22] Filed: Jan. 17, 1992

[51] Int. Cl.⁵ ............................................. B29C 49/24
[52] U.S. Cl. .................................... 156/571; 156/567; 156/572; 156/DIG. 31; 264/509; 264/543; 414/744.3; 414/744.7; 414/797
[58] Field of Search ................ 264/509, 543; 425/503, 425/504, 540; 271/11, 14, 107; 414/797, 744.3, 744.7; 156/567, 571, 572, DIG. 29, DIG. 30, DIG. 31

[56] References Cited

U.S. PATENT DOCUMENTS

| | | | |
|---|---|---|---|
| 2,750,624 | 6/1956 | Coates et al. | 264/543 |
| 3,212,129 | 10/1965 | Craig et al. | 425/540 |
| 3,599,280 | 8/1971 | Rosenkranz et al. | 425/540 |
| 4,355,967 | 10/1982 | Hellmer | 264/509 |
| 4,359,314 | 11/1982 | Hellmer | 264/509 |
| 4,418,906 | 12/1983 | Scott | 271/107 |
| 4,595,447 | 6/1986 | Lindstrom | 156/571 |
| 4,616,992 | 10/1986 | Oles | 425/503 |
| 4,878,823 | 11/1989 | Bloomquist | 425/540 |
| 5,039,298 | 8/1991 | Takakusaki et al. | 264/509 |

FOREIGN PATENT DOCUMENTS

| | | | |
|---|---|---|---|
| 1180508 | 10/1964 | Fed. Rep. of Germany | 264/543 |
| 3319476 | 5/1984 | Fed. Rep. of Germany | 264/509 |
| 775819 | 5/1957 | United Kingdom | 156/571 |

*Primary Examiner*—Jan H. Silbaugh
*Assistant Examiner*—Catherine Timm
*Attorney, Agent, or Firm*—Wolf, Greenfield & Sacks

[57] ABSTRACT

An in-mold labelling system for automatically applying labels to the interior of blow mold halves prior to the placement of preforms within such blow mold halves; the preforms are blown to form containers with a label attached thereto. The labelling system is mounted on a rotating drum having a plurality of blow mold sets. A label magazine is also mounted on the drum and preferably carries two stacks of labels. Associated with each label stack is a support shaft having at one end a transverse arm which, in turn, carries a suction cup for pick-up and deposit of the label. The other end of the support shaft extends through a drive mechanism for rotating the support shaft so as to swing the transverse arm to a first position for label pick-up from the magazine and then to a second position for label deposit in the blow mold.

18 Claims, 4 Drawing Sheets

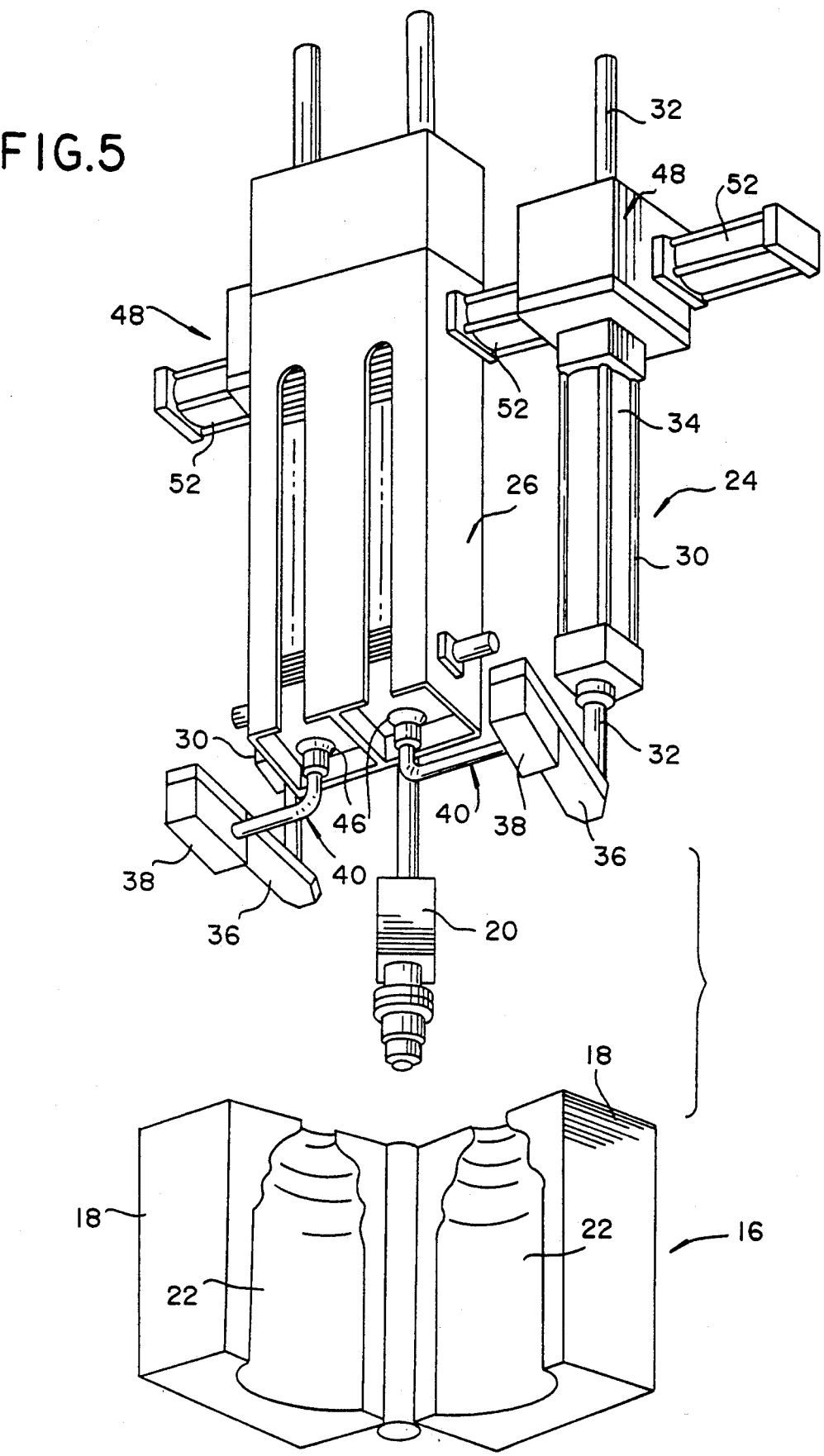

IN-MOLD LABELLING SYSTEM

This invention relates in general to new and useful improvements in the placing of labels within molds in which containers and the like are to be blow molded, and more particularly to an in-mold labelling system for blow molds which are formed of two halves which open for the discharge of a container and the insertion of the labels.

BACKGROUND OF THE INVENTION

It is known to provide in-mold labelling systems for blow molds of the split half type wherein the blow molds rotate in a circular pattern and open radially. Such blow mold labelling systems are fixed on the carriage of the machine frame and when the blow molds are opened and immediately after the discharge of a blow molded article therefrom, label applicators are moved transversely into the path of the rotating blow molds for placing labels into one or both of the mold halves.

SHORT DESCRIPTION OF THE INVENTION

This invention relates to a blow molding machine wherein a plurality of molds are mounted on a rotating turret with each blow mold being formed in two halves pivotally connected together for opening and closing about a vertical pivot axis. This invention most particularly relates to the provision of an in-mold labelling system which can be mounted on the same turret, either below or above each blow mold for applying one or more labels to the mold halves when the blow mold is opened following the blow molding of a container.

With the above and other objects in view that will hereinafter appear, the nature of the invention will be more clearly understood by reference to the following detailed description, the appended claims, and the several views illustrated in the accompanying drawings.

FIG. 5 is a perspective view similar to FIG. 2 but showing the in-mold labelling system positioned above the blow mold with the labelling system being inverted for that shown in FIG. 2.

DESCRIPTION OF THE INVENTION

Figure 1:
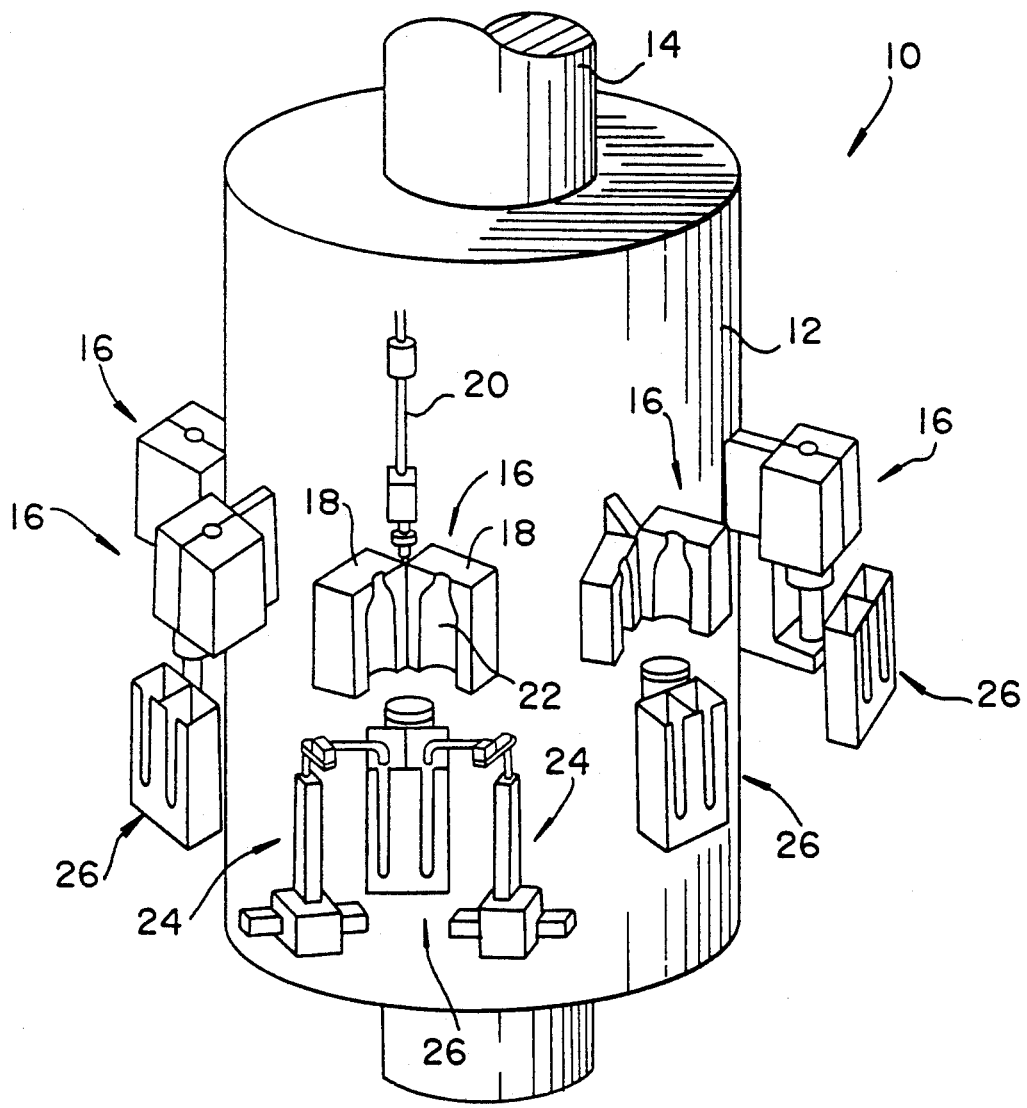
FIG. 1 is a schematic perspective view of a rotary blow molder that is readily available and shows the blow molder provided with in-mold labelling assemblies, there being an in-mold labelling assembly for each of the blow molds.

Referring now to the drawings in detail, reference is first made to FIG. 1 wherein there is illustrated a conventional rotary blow molder generally identified by the numeral 10. The blow molder includes a hub or turret assembly 12 which is mounted on a rotating vertical shaft 14. The turret 12 carries a plurality of blow mold sets 16 with each set 16 including two blow mold halves 18 which are pivotally mounted for opening and closing.

The conventional machine 10 receives a preform and is then closed on the preform, after which a stretch rod/stuffer assembly 20 is moved down into the preform so as to simultaneously axially stretch the preform and direct high pressure gas into the preform to effect blow molding of the preform to match a typical blow mold cavity 22.

The blow molder 10 per se is not part of this invention. This invention relates to the provision of an in-mold labelling system generally identified by the numeral 24. The in-mold labelling systems are automatically operated to remove one or two labels L from a label magazine 26 and place such label or labels in respective cavities 22.

Figure 2:
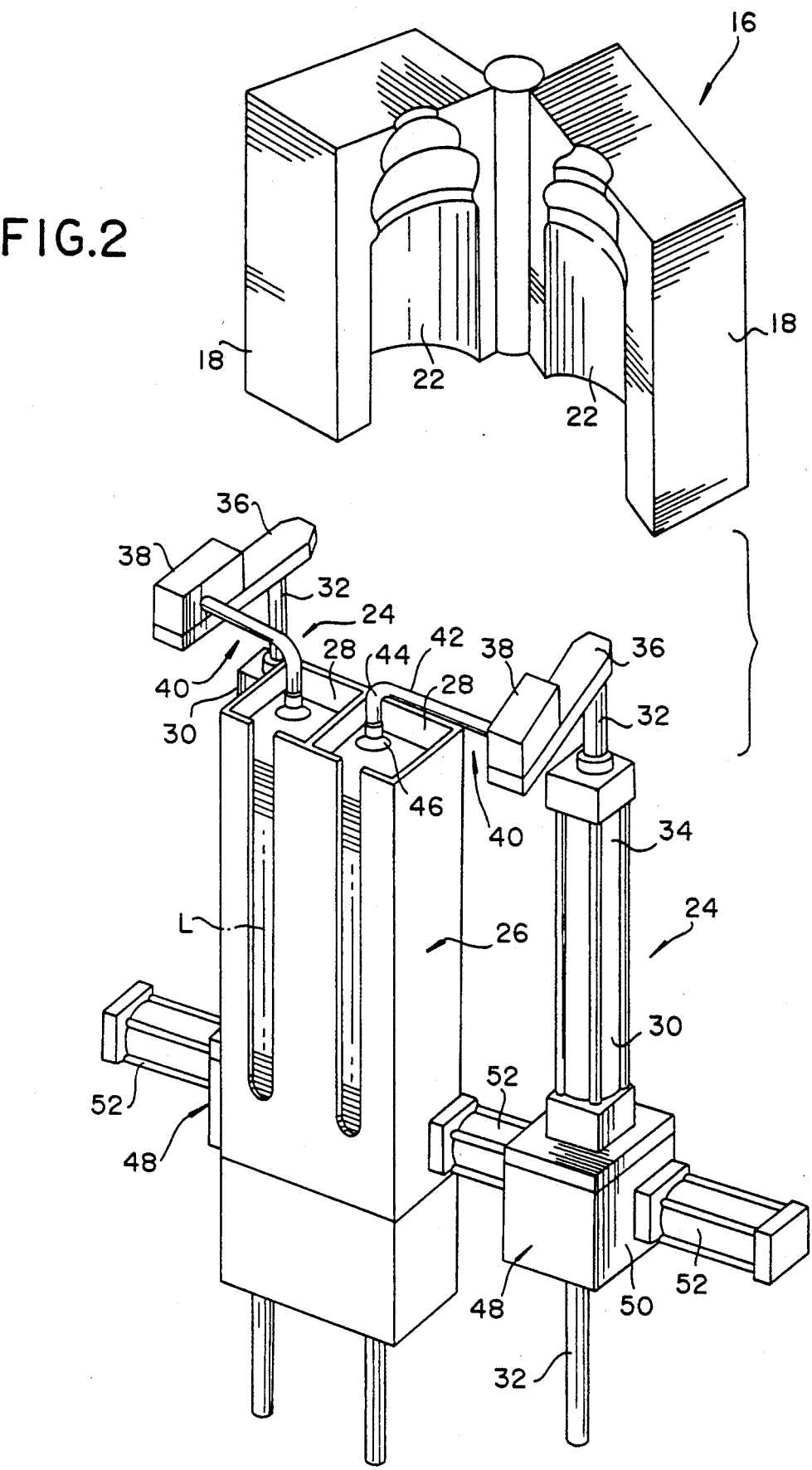
FIG. 2 is a schematic perspective view showing the relationship of one of the blow molds and the associated in-mold labelling system.

Reference is now made to the schematic showing of FIG. 2 where it will be seen that for each blow mold set 16 there is a magazine 26 and the magazine 26 is vertically disposed generally in alignment with the blow mold set 16. The magazine 26 rs preferably provided with two vertically disposed label receiving compartments 28 in which labels L are stored in stacked relation. The magazine 26 is generally of a conventional structure and is provided with suitable means for maintaining the uppermost label L at a fixed height.

A separate in-mold labelling system 24 is disposed at each side of the magazine 26. Each labelling system 24 includes a vertically disposed extensible fluid motor 30 which includes an elongated piston rod 32 that extends through a cylinder 34 of the fluid motor 30. The piston rod 32 is in the form of a support shaft.

The upper end of the piston rod or support shaft 32 is provided with a transverse arm 36 on which there is mounted a rotary mounting unit 38 that supports a pickup arm 40 for limited rotation. The pickup arm 40 is generally of L-shaped configuration and includes an elongated shaft portion 42 which rs horizontally disposed and which is carried by the rotary mount 38. The pickup arm 40 also includes an end portion which is disposed at right angles to the shaft portion 42 and carries a suction cup 46.

While the fluid motor 30 serves to axially move the support shaft 32, the support shaft 32 is also mounted for rotary movement. The rotation of the support shaft 32 is controlled by a drive unit generally identified by the numeral 48. The rotary drive unit 48 includes a housing 50 on which there is mounted a pair of horizontally disposed, aligned, extensible fluid motors 52.

Figure 4:
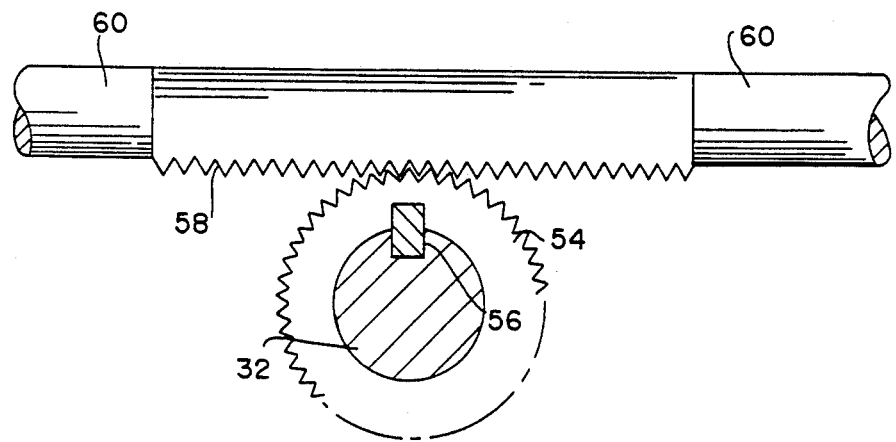
FIG. 4 is a schematic sectional view showing the manner in which a support shaft is mounted for controlled rotation while being vertically adjustable.

Reference is now made to FIG. 4 wherein it will be seen that the support shaft 32 carries a gear 54 which is suitably mounted within the housing 50 for rotation. The gear 54 is connected to the support shaft 32 by a key 56. Thus the support shaft 32 is vertically slidable through the gear 54 which is suitably mounted in a manner not shown against vertical movement.

A rack 58 is engaged with the gear 54 to effect rotation of the gear 54 and thus rotation of the support shaft 32. The rack 58 is secured at opposite ends thereof to piston rods 60 of the fluid motors 52.

It is to be understood that the in-mold labelling systems 24 and the magazines 26 are suitably secured to the turret 12 for rotation therewith and are generally fixed relative to the associated mold sets 16.

OPERATION

The starting portion of the in-mold labelling system 24 is with the suction cup 46 lowered into the label storage area 28 and in engagement with the uppermost label L. A vacuum is drawn in the suction cup 46 through the pickup arm 40 in a manner not shown. As the turret 12 approaches the label applying station, the labelling system 24 is actuated to begin moving the support shaft 32 vertically and as soon as the suction cup 46 and the pickup arm 40 clear the magazine 26, the support shaft 32 begins to turn generally towards the respective mold half 18 while the pickup arm 40 is rotated so as to have the suction cup 46 and the label carried thereby face the cavity 22 of the mold half. The final rotation of the support shaft 32 presents the label L to the mold cavity 22 as is clearly shown in FIG. 3. Immediately upon the presentation of a label L to the respective mold cavity 22, the rotation of the support shaft 32 is reversed so as to remove the suction cup 46 out of the mold cavity 22 so as to permit the mold set 16 to be closed. The support shaft 32 begins to move downwardly while the pickup arm 40 begins to rotate to present the suction cup 44 downwardly. Of course, the vacuum directed to the suction cup 46 is removed at the time the label L is applied to the mold half 18. If desired, suitable vacuum means (not shown) may be provided in the mold halves 18 to maintain the labels L in their applied positions.

Figure 3:
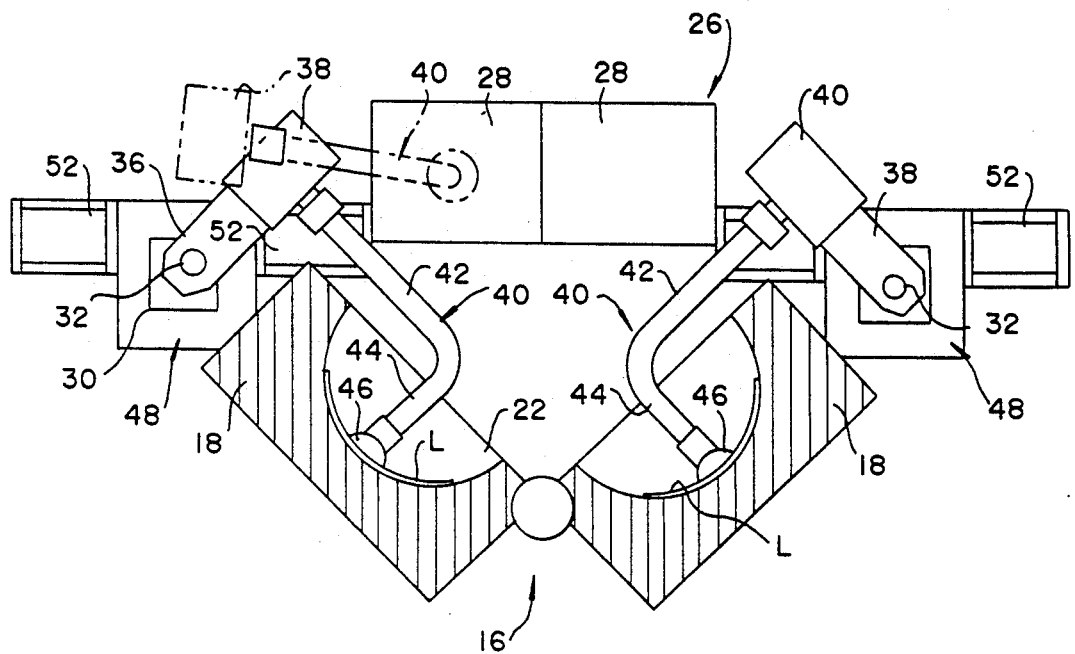
FIG. 3 is a horizontal sectional view taken through the open blow mold and shows labels being applied to the two halves thereof.

Operation of the labelling system 24 continues until the suction cup has returned to its position engaging the respective uppermost label L as shown in dotted lines in FIG. 3 and solid lines in FIG. 2.

The blow molder continues to rotate and to operate to apply a preform to the mold set 16 followed by the operation of the stretch rod/stuffer assembly 20 to stretch and inflate the preform.

It is to be understood that the fluid motors of each labelling system 24 are actuated in timed relation with the operation of the blow molder 10.

It is also to be noted from FIGS. 2 and 3 in particular, that preferably means are provided for placing a label L into the cavity 22 of each mold half 18 and thus there is a second labelling system 24 on the opposite side of the magazine 26.

MODIFIED FORM OF INVENTION

Referring now to FIG. 5, it will be seen that there is illustrated an installation wherein the magazine 26 and the labelling system 24 are disposed above the mold set 16 and are inverted with respect thereto. Other than this change in relationship, the structure and operation of the label applying equipment rs the same as that illustrated in FIG. 2 and most specifically hereinabove. It is, however, pointed out here that the normal mounting of the magazine 26 is one wherein the stretch rod/stuffer assembly 20 is cleared for normal operation.

Although only two preferred embodiments of the in-mold labelling system have been specifically illustrated and described herein, it is to be understood that minor variations may be made in the labelling systems without departing from the spirit and scope of the invention as defined by the appended claims.

We claim:

1. A molding machine comprising:
a drum mounted for rotation, at least one split mold set mounted on said drum for rotation, and a labelling system mounted on said drum adjacent said split mold set for rotation with said drum and said split mold set for automatically applying labels to said split mold set;
said labelling system comprising an elongated support shaft, a transverse arm carried by said support shaft for movement with said support shaft, a pickup arm carried by said transverse arm, first means for axially moving said support shaft, second means for rotationally moving said support shaft, and third means for rotating said pickup arm relative to said transverse arm;
said pickup arm being generally L-shaped and including an elongated mounting portion carried by said third means for rotation about is axis and a suction head supporting portion; and
wherein said third means is operable to rotate said mounting portion about its axis to selectively move said suction head supporting portion between a position parallel to said support shaft and a position normal to a plane through said support shaft.

2. A molding machine according to claim 1 wherein said transverse arm extends in cantilever relation and carries said third means and said pickup arm remote from said support arm.

3. A molding machine according to claim 1 wherein said first means is an extensible fluid motor including a cylinder, and said support shaft is in the form of a piston rod extending from opposite ends of said cylinder.

4. A molding machine according to claim 3 wherein said transverse arm and said pickup arm are to one end of is support shaft and said second means are at a remote end of said cylinder.

5. A molding machine comprising:
a drum mounted for rotation, at least one split mold set mounted on said drum for rotation, and a labelling system mounted on said drum adjacent said split mold set for rotation with said drum and said split mold set for automatically applying labels to said split mold set;
said labelling system comprising an elongated support shaft, a transverse arm carried by said support shaft for movement with said support shaft, a pickup arm carried by said transverse arm, first means for axially moving said support shaft, second means for rotationally moving said support shaft, and third means for rotating said pickup arm relative to said transverse arm;
said first means being an extensible fluid motor including a cylinder, and said support shaft being a piston rod extending from opposite ends of said cylinder;
said transverse arm and said pickup arm being at one end of said support shaft and said second means at a remote end of said cylinder; and
wherein said second means includes a gear mounted on said support shaft for axial movement of the support shaft relative to said gear and for connected rotational movement of both the gear and support shaft, and a rack engaged with said gear.

6. A molding machine according to claim 5 wherein said second means further includes a second extensible motor mans for moving and positioning said rack.

7. A molding machine according to claim 6 wherein said third means is in the form of a rotary mounting unit for supporting said pickup arm on said transverse arm for rotation.

8. A molding machine according to claim 5 wherein said second mean further includes a motor means for reciprocating and positioning said rack to rotate and position said support shaft.

9. A molding machine comprising:
a drum mounted for rotation, at least one split mold set mounted on said drum for rotation, and a labelling system mounted on said drum adjacent said split mold set for rotation with said drum and said split mold set for automatically applying labels to said split mold set;

said labelling system comprising an elongated support shaft, a transverse arm carried by said support shaft for movement with said support shaft, a pickup arm carried by said transverse arm, first means for rotationally moving said support shaft, and third means for rotating said pickup arm relative to said transverse arm;

said first means being an extensible fluid motor including a cylinder, and said support shaft being a piston rod extending from opposite ends of said cylinder;

said transverse arm and said pickup arm being at one end of said support shaft and said second means at a remote end of said cylinder; and wherein said third means is in the form of a rotary mounting unit for supporting said pickup arm on said transverse arm for rotation.

10. A molding machine according to claim 9 together with a label magazine mounted no said drum and having a label holding area disposed parallel to said support shaft and having an open label dispensing end for receiving said pickup arm.

11. A molding machine according to claim 10, wherein said label magazine is associated with a longitudinally split blow mold having two halves, and said label magazine is generally in spaced axial alignment with said blow mold.

12. A molding machine comprising:

a drum mounted for rotation, at leas tone split mold set mounted on said drum for rotation, and a labelling system mounted on said drum adjacent said split mold set for rotation with said drum and said split mold set for automatically applying labels to said split mold set;

wherein said labelling system comprises an elongated support shaft, a transverse arm carried by said support shaft for movement with said support shaft, a pickup arm carried by said transverse arm, first means for axially moving said support shaft, second means for rotationally moving said support shaft, and third means for rotating said pickup arm relative to said transverse arm; and a label magazine having a label holding area disposed parallel to said support shaft and having an open label dispensing end for receiving said pickup arm;

wherein said label magazine is associated with a longitudinally spit blow mold having two halves, and said label magazine is generally in spaced axial alignment with said blow mold with said open label dispensing end generally opening towards said blow mold.

13. A molding machine according to claim 12 wherein said pickup arm has a position extending into said label magazine and engaging an endmost label for pickup.

14. A molding machine according to claim 13 wherein said pickup arm has a second position rotated about said support shaft, displaced axially from said label magazine and rotated by said third means placing a label in one of said mold halves.

15. A molding machine according to claim 12 wherein said pickup arm has a position rotated about said support shaft, displaced axially from said label magazine and rotated by said third means placing a label in one of said mold halves.

16. A molding machine according to claim 12 wherein said blow mold, said magazine and said labelling system are all vertically disposed.

17. A molding machine according to claim 12 wherein said blow mold, said magazine and said labelling system are all vertically disposed, and mounted for rotation in unison with said drum.

18. A molding machine according to claim 12 wherein said magazine is configured to present two stacks of labels in parallel adjacent relation, nd there are two sets of said labelling systems, one on each side of said label magazine whereby a label may be placed in each of the mold halves.

* * * * *

UNITED STATES PATENT AND TRADEMARK OFFICE
CERTIFICATE OF CORRECTION

PATENT NO.   : 5,266,149
DATED        : November 30, 1993
INVENTOR(S)  : Collette, et al It is certified that error appears in the above-indentified patent and that said Letters Patent is hereby corrected as shown below:

Column 2, line 19, delete "rs" and substitute --is--.

Column 2, line 36, delete "rs" and substitute --is--.

Column 2, line 65, delete "portion" and substitute --position--.

Column 3, line 47, delete "rs" and substitute --is--.

Column 4, line 56, delete "mans" and substitute --means--.

Column 4, line 62, delete "mean" and substitute --means--.

Column 5, line 8, after "for insert --axially moving said support shaft, second means for--.

Column 5, line 22, delete "no" and substitute --on--.

Column 5, line 32, delete "leas tone" and substitute --least one--.

Column 6, line 9, delete "spit" and substitute --split--.

Column 6, line 37, delete "nd" and substitute --and--.

On the Title Page, Item [57];

In line 10 of the Abstract, after "a" insert --motor which rotatably mounts an L-shaped pickup arm having a--.

Signed and Sealed this

Tenth Day of May, 1994

Attest:

BRUCE LEHMAN

Attesting Officer      Commissioner of Patents and Trademarks